United States Patent
Ottersten et al.

(10) Patent No.: US 11,926,457 B2
(45) Date of Patent: Mar. 12, 2024

(54) SAMPLING CONTAINER, SAMPLING SYSTEM AND SAMPLING METHOD FOR PROCESSING A LIQUID SAMPLE

(71) Applicant: Endress+Hauser Conducta GmbH+Co. KG, Gerlingen (DE)

(72) Inventors: Bo Ottersten, Regensburg (DE); Eckhard Sommer, Sternenfels (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 774 days.

(21) Appl. No.: 16/556,343

(22) Filed: Aug. 30, 2019

(65) Prior Publication Data
US 2020/0071045 A1 Mar. 5, 2020

(30) Foreign Application Priority Data
Aug. 31, 2018 (EP) ..................................... 18191915

(51) Int. Cl.
*B65D 65/46* (2006.01)
*B01L 3/00* (2006.01)

(52) U.S. Cl.
CPC ............ *B65D 65/466* (2013.01); *B01L 3/505* (2013.01); *B65D 2565/385* (2013.01)

(58) Field of Classification Search
CPC .. B65D 65/466; B65D 2565/385; B01L 3/505
USPC ...................................................... 73/864.51
See application file for complete search history.

(56) References Cited

U.S. PATENT DOCUMENTS

| | | | |
|---|---|---|---|
| 4,771,686 A | 9/1988 | Triantos | |
| 5,339,700 A | 8/1994 | Wright et al. | |
| 5,878,813 A | 3/1999 | Ridgemay, Jr. | |
| 2010/0084361 A1 | 4/2010 | Dayton et al. | |
| 2010/0119417 A1* | 5/2010 | Motadel | B01L 3/00 264/320 |
| 2010/0180698 A1 | 7/2010 | Lopez Alvarez et al. | |
| 2011/0097250 A1 | 4/2011 | Yong | |
| 2011/0219891 A1* | 9/2011 | Mihaylov | G01N 1/02 413/1 |
| 2011/0239893 A1* | 10/2011 | Delmonico | E01B 29/32 104/16 |
| 2014/0242716 A1* | 8/2014 | Hartselle | B01L 3/508 422/557 |
| 2016/0054202 A1* | 2/2016 | Yong | B01L 3/502 73/864.63 |

(Continued)

FOREIGN PATENT DOCUMENTS

| | | |
|---|---|---|
| CN | 1700884 A | 11/2005 |
| CN | 200955999 Y1 | 10/2007 |

(Continued)

*Primary Examiner* — J. Gregory Pickett
*Assistant Examiner* — Niki M Eloshway
(74) *Attorney, Agent, or Firm* — Kelly J. Smith; Endress+Hauser (USA) Holding, Inc.

(57) ABSTRACT

The disclosure relates to a sampling system for processing a liquid sample, including a retrieving module configured to be fluidically connected to a liquid-source and configured to retrieve a liquid sample from the liquid-source, a filling module configured to fill the retrieved liquid sample into a sampling container, a storing module configured to store the sampling container filled with the liquid sample, and a disposal module configured to discard the liquid sample.

11 Claims, 2 Drawing Sheets

(56) References Cited

U.S. PATENT DOCUMENTS

| | | |
|---|---|---|
| 2017/0096297 A1 | 4/2017 | Call |
| 2018/0106821 A1 | 4/2018 | Vollenweider et al. |
| 2018/0127740 A1* | 5/2018 | Morhet .............. C12N 15/1006 |
| 2019/0125316 A1* | 5/2019 | Tariyal ............... A61B 10/0045 |
| 2020/0024044 A1* | 1/2020 | Wright ................... C08K 5/092 |
| 2020/0025782 A1* | 1/2020 | Ahlfors ............. G01N 35/0099 |

FOREIGN PATENT DOCUMENTS

| | | |
|---|---|---|
| CN | 104236191 A | 12/2014 |
| CN | 205527819 U | 8/2016 |
| CN | 106370879 A | 2/2017 |
| CN | 206161381 U | 5/2017 |
| EP | 2487478 A | 8/2012 |
| EP | 2487478 A1 | 8/2012 |
| GB | 2323314 A | 9/1998 |
| JP | 2017114607 A | 6/2017 |

* cited by examiner

SAMPLING CONTAINER, SAMPLING SYSTEM AND SAMPLING METHOD FOR PROCESSING A LIQUID SAMPLE

CROSS-REFERENCE TO RELATED APPLICATION

The present application is related to and claims the priority benefit of European Patent Application No. 18191915.0, filed on Aug. 31, 2018, the entire contents of which are incorporated herein by reference.

TECHNICAL FIELD

The present disclosure relates to a sampling container for storing a liquid sample, a sampling system for processing a liquid sample and a sampling method for processing a liquid sample.

BACKGROUND

In the field of liquid process measurement, for example in the processing of drinking water or waste water, it is important to guarantee a constant quality of the processed liquid. Liquid samples are taken in predefined intervals from the processed liquid in order to monitor the quality of the liquid. The sampling of the liquid is generally done by an automatic sampling system. The liquid samples are filled in a recipient. The collected liquid samples can then be transported to a laboratory for analysis. Generally, the laboratory is geographically separated from the sampling system. For this reason, automatic sampling systems are equipped with a storage for temporarily storing the liquid samples. The stored liquid samples must be cooled during storage in order to avoid any alteration of the liquid sample in the period between the sampling and the examination of the liquid sample in the laboratory. Commonly, only certain liquid samples out of all temporally stored liquid samples are transported to a laboratory for analysis of the liquid sample. The liquid samples which are chosen to be analyzed in the laboratory are selected depending on a specific criterion, for example the period in which they have been collected. The liquid samples which are not analyzed can be discarded by the sampling system automatically.

Known automatic liquid sampling systems or automatic self-emptying sampling systems store the liquid samples in reusable sampling containers, in particular, reusable glass bottles. One disadvantage with these sampling systems is, that the reusable glass bottles must be cleaned after a liquid sample is discarded to avoid cross contamination between the different liquid samples which are stored subsequently in these bottles. However, such a cleaning process must be performed with high accuracy and thus requires sophisticated cleaning equipment. For example, the cleaning equipment may have nozzles and brushes which must be adapted to clean the bottles with high precision. The cleaning equipment must have a cleaning water source and may have a reservoir for chemical cleaning substances which are added into the cleaning water. This cleaning equipment has a high influence on the overall price of the liquid sampling system and thus is reflected in the price of each liquid sample. In addition, the cleaning of the glass bottles requires a non-negligible quantity of clean water and chemical cleaning substances. Therefore, the overall eco-balance of known cleaning sampling systems and liquid samples is negatively influenced by the cleaning equipment. Another disadvantage with the known sampling systems is that the storage of the bottles containing the liquid sample must be handled and stored with care in order to avoid the bottles breaking. A further problem with the existing sampling systems is that the sampling process must be stopped during discarding of the liquid samples or when liquid samples have to be taken out of the sampling system for analysis of the liquid samples. This implies sampling constraints which limit the sampling rate of liquid samples.

SUMMARY

An objective of the present disclosure is to overcome the disadvantages of existing sampling containers, of liquid sampling systems and of liquid sampling methods, and to provide a sampling container, a liquid sampling system, and a liquid sampling method which allows for an easy, economical, ecological, safe and time saving way to perform liquid sampling. This objective is achieved by a sampling container, sampling system, and sampling method described herein.

The sampling container according to the present disclosure is for storing a liquid sample and is a single-use sampling container made of a material which is bio-degradable.

Such a sampling container allows for discarding the liquid sample and the sampling container without cleaning the sampling container because the sampling container is only used once. A single-use sampling container cannot provoke cross-contamination between liquid samples because each liquid sample is received in a unique and separate sampling container. Furthermore, there is no need for cleaning the sampling container according to the present disclosure, and thus, no cleaning water source and no chemical cleaning substances are required. This reduces the overall cost for each liquid sample and allows to obtain a better eco-balance for each liquid sample. In addition, the eco-balance is not negatively influenced by the single-use of the sampling container as the sampling container is bio-degradable. The bio-degradable sampling container allows for bio-degradation with or without the sampling liquid inside the sampling container. The sampling container is environmentally friendly. In addition, as no cleaning of the sampling container is required, the discarding of non-required liquid samples can be done in a minimum amount of time. Therefore, the sampling rate can be maximized.

In one embodiment compatible with the before mentioned embodiments, the sampling container is made of a material which is recyclable.

In one embodiment compatible with the before mentioned embodiments, the sampling container is a bag or a closeable cup.

In one embodiment compatible with the before mentioned embodiments, an individual identification code is marked on the sampling container.

In one embodiment compatible with the before mentioned embodiments, the individual identification code comprises a sample sign and/or a sample date indication and/or a sample time indication and/or a sample volume indication.

The above-mentioned objective is also achieved by a sampling system for processing a liquid sample, including a retrieving module adapted to be fluidically connected to a liquid-source and adapted to retrieve a liquid sample from the liquid-source, a filling module adapted to fill the retrieved liquid sample into a sampling container according to one of the previous described embodiments, a storing module adapted to store the sampling container filled with the liquid sample, and a disposal module adapted to discard the liquid sample. As used throughout the specification, "adapted to" and "configured to" may be used interchangeably.

In one embodiment compatible with the before mentioned embodiments, the filling module is adapted to close the sampling container filled with the liquid sample by a weld seam or a glue seam.

In one embodiment compatible with the before mentioned embodiments, the sampling system further comprises an identification module adapted to mark an identification code on the sampling container.

In one embodiment compatible with the before mentioned embodiments, the disposal module is arranged below the storing module.

In one embodiment compatible with the before mentioned embodiments, the storing module is adapted to store several sampling containers each filled with a liquid sample in a chronological order.

In one embodiment compatible with the before mentioned embodiments, the disposal module comprises a liquid drainage and a waste bin. The disposal module is adapted for opening the sampling container and is adapted for evacuating the liquid sample from the sampling container. The liquid drainage is adapted for evacuating the liquid sample from the sampling system and the waste bin is adapted for receiving the emptied sampling container.

In one embodiment compatible with the before mentioned embodiments, the sampling system further comprises a transporter adapted to transport the sampling container filled or not filled with a liquid sample between at least the retrieving module, the filling module and the disposal module.

The above-mentioned objective is also achieved by a sampling method, wherein the sampling method includes at least the steps of: providing a liquid-source and a sampling system, wherein the sampling system is fluidically connected to the liquid-source, retrieving a liquid sample from the liquid-source by the retrieving module, filling the sampling container with the retrieved liquid sample by the filling module, storing the sampling container filled with the liquid sample in the storing module, and discarding the liquid sample by the disposal module.

In one embodiment compatible with the before mentioned embodiments, after or before the step of filling the sampling container, a step of marking the filled sampling container with an identification code by the identification module is performed.

In one embodiment compatible with the before mentioned embodiments, at least two sampling containers are each filled with a liquid sample and are stored in the storing module in a chronological order.

BRIEF DESCRIPTION OF THE DRAWINGS

The present disclosure will now be explained in greater detail on the basis of the appended drawing, the figures of which show as follows.

DETAILED DESCRIPTION

Figure 1:
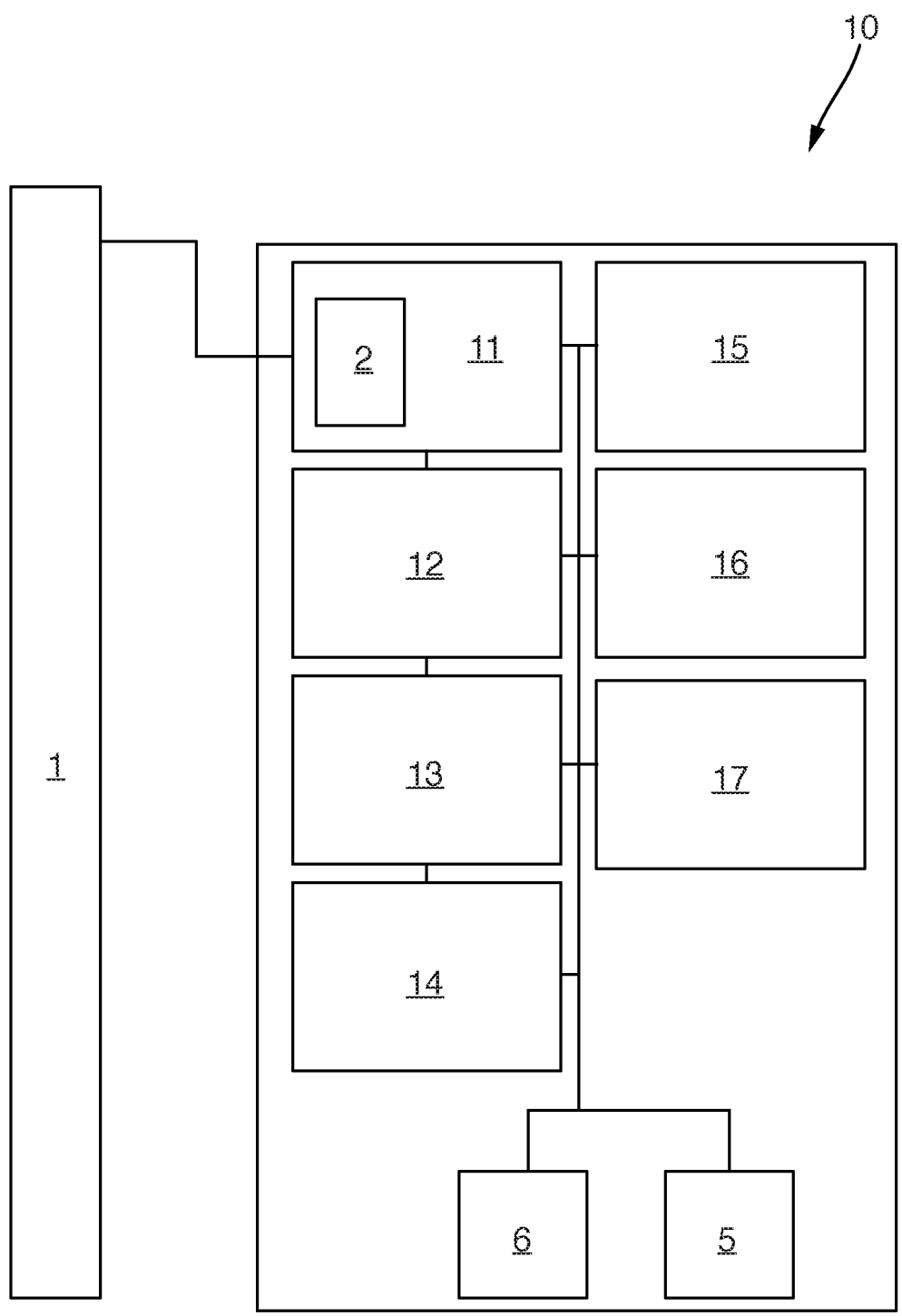
FIG. 1 shows a schematic view of a sampling system for processing a liquid sample according to the present disclosure.

FIG. 1 shows a liquid source 1, a sampling container 2 and a sampling system 10 for processing a liquid sample. The liquid-source 1 can be for example a pipe-line transporting the liquid to be sampled. The sampling system 10 is fluidically connected to the liquid-source 1. The sampling system 10 is adapted to fill the liquid sample in the sampling container 2. The sampling system 10 may comprise a liquid drainage 5 and a waste bin 6.

In the following description, the singular form of sampling container is used for the sake of simplicity. However, as far as technically possible, a multitude of sampling containers may also be understood when referring to a single sampling container.

FIG. 1 shows interconnections between different elements of the sampling system by a solid line. These interconnections indicate that, for example, information, a sample liquid, a sample container 2, etc. can be exchanged between the interconnected elements.

The sampling system 10 comprises a retrieving module 11 adapted to retrieve a liquid sample from the liquid source 1. The retrieving module 11 is connected to a controller 12 which is adapted to control the retrieving module 11. The retrieving module 11 is controlled such that a liquid sample can be retrieved from the liquid source 1 with a predetermined quantity and at predetermined moments. This allows for a predefined sampling rate.

The sampling system 10 further comprises a filling module 13 adapted to fill the liquid sample into the sampling container 2. The sampling container 2 comprises a closure 4 (shown in FIGS. 2-4). This closure 4 may be a hermetic closure. The filling module 13 is further adapted to close the sampling container 2. The sampling container 2 can be made of a material which is bio-degradable, i.e. a material that disintegrates by bacteria, fungi or other biological means. This improves the eco-balance of the sampling container 2. Alternatively, or additionally, to the bio-degradation capacity of the sampling container 2, the sampling container 2 can be made of a material which is recyclable, i.e. to reusable for production of another product. This allows for further improving the eco-balance of the sampling container 2.

Figure 2:
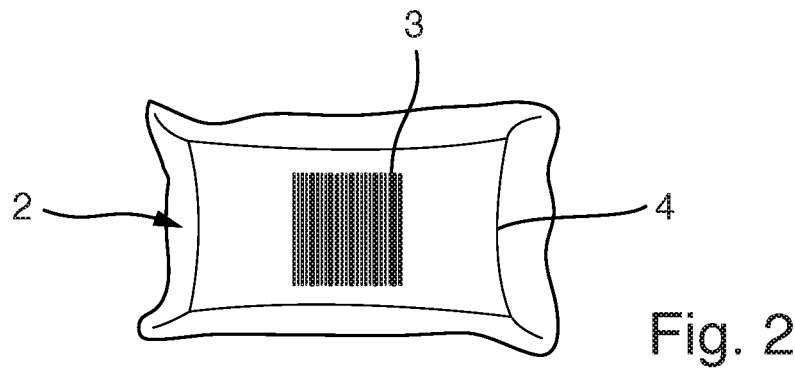
FIG. 2 is a first example of a sampling container according to the present disclosure.
Figure 3:
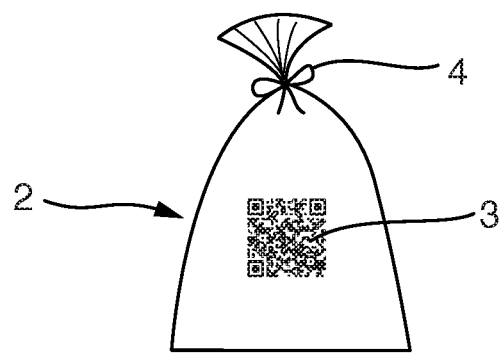
FIG. 3 is a second example of a sampling container according to the present disclosure and FIG. 4 is a third example of a sampling container according to the present disclosure.
Figure 4:
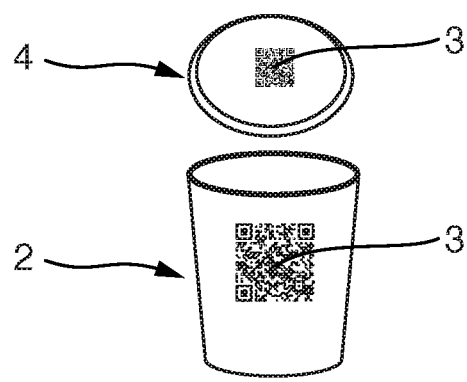

FIGS. 2 to 4 show different types of sampling containers 2 and closures 4. The sampling container 2 can be for example a bag or a closeable cup.

The closure 4 avoids contamination or altering of the liquid sample inside the sampling container 2. In one embodiment shown in FIG. 2, the closure 4 is a weld seam. The weld seam is used for example, if the sampling container 2 is made of a weldable material, for example plastic. The closure 4 can also be a glue seam. In this case, the filling module 13 is adapted to weld or to glue the filled sampling container 2. A closure that is welded or glued is a hermetic closure. A hermetic closure allows for maximum protection against contamination of the liquid sample inside the sampling container 2. The closure 4 can also be a removable closure, as shown in FIGS. 3 and 4. A removable closure allows for easy opening of the sampling container 2, which is particularly advantageous when the liquid sample must be opened and closed several times, for example in a laboratory.

The removable closure 4 can be for example a lace, as shown in FIG. 3, or can be, for example, a removable cap, as shown in FIG. 4, or can be an adhesive tape (not shown).

The removable cap can have a seal for sealing the cap with the cup. This seal can be a hermetic seal.

The sampling system 10 further includes a storing module 14 adapted to store the sampling container 2 for a predetermined time. The storing module 14 is adapted to receive a multitude of sampling containers 2. The storing module 14 can be arranged below the filling module 13 in order to easily receive the filled sampling containers 2. For example, the filling module 13 may be adapted to drop the filled sampling containers 2 into the storing module 14 after filling and closing the sampling containers 2. This arrangement enables the use of gravity for moving the sampling containers 2 into the storage module 14. The storing module 14 can be cooled to a predetermined temperature in order to prevent the liquid sample from being altered during the storing period.

The sampling system 10 is adapted to store several sampling containers 2 in a chronological order. For example, the sampling containers can be piled up in the storage. For example, the storage is organized according to the first-in-first-out principle, also called the "FIFO" principle.

The sampling system 10 further comprises a disposal module 15 adapted to discard the liquid sample. The disposal module 15 is adapted to open the sampling container 2 such that the liquid sample is evacuated from the sampling container 2. The disposal module 15 may be adapted to open the sampling container 2 in a non-destructive way, for example by removing the lace or the cap.

In an alternative embodiment, the disposal module 15 may be adapted to open the sampling container 2 in a destructive way, for example by puncturing or cutting the bag or cup. A separation of the liquid sample from the sampling container 2 is particularly advantageous, if the sampling container 2 is recycled or processed separately from the liquid sample after discarding of the sampling container 2 and the liquid sample.

The disposal module 15 may comprise a liquid drainage 5 adapted to receive the discarded liquid sample. The disposal module 15 is adapted to evacuate the liquid sample from the sampling system 10. For example, in the case where the liquid sample is waste water, the disposal module 15 is adapted to reintroduce the discarded liquid sample upstream to the sampling system 10 into the system producing the liquid source. For example, such a system producing the liquid source may be a purification plant.

The disposal module 15 may further comprise a waste bin 6 adapted for receiving the emptied sampling container 2. The waste bin 6 allows for collecting all material which has to be recycled or disintegrated.

In an alternative embodiment, the disposal module 15 is adapted to discard the liquid sample without evacuation from the sampling container 2. This is particularly advantageous if the sampling container 2 can be processed together, for example, if the filled sampling container 2 is destined to be inserted into a digestion tower of for example a purification plant, for disintegration of the sampling container 2.

The disposal module 15 according to all embodiments can be arranged below the storing module 14 in order to easily receive the filled sampling containers 2. For example, the storage module 14 may be adapted to drop the filled sampling containers 2 into the disposal module 15 when the sampling container 2 is discarded. This arrangement enables the use of gravity for moving the sampling containers 2 into the disposal module 15.

The sampling system 10 may further comprise an identification module 16 adapted to mark an identification code 3 on the sampling container 2. The identification code 3 enables the identification of each liquid sample individually. The information included in the identification code 3 may be, for example, a sample sign and/or a sample date indication and/or a sample time indication and/or a sample volume indication. The identification module 16 may be adapted to use a printing method, a material removing method or a material transforming method in order to perform the marking of the sampling container 2.

The sampling system 10 may further comprise a transporter 17 adapted to transport the sampling container 2 filled or not filled with a liquid sample between the retrieving module 11, the filling module 13, the storing module 14, the disposal module 15, the identification module 16, the liquid drainage 5 and the waste bin 6. The transporter 17 may be embodied as a robot arm, a conveyor belt or any other suitable system. The transporter 17 can be controlled by the controller 12. The controller 12 is adapted to control the whole sampling system 10.

The sampling method for processing a liquid sample is described now.

In a first step, the above described sampling system 10 and above described sampling container 2 are provided. The controller 12 controls the whole sampling system 10 in order to process a liquid sample.

In a subsequent step, the liquid sample is retrieved from the liquid source 1 by the retrieving module 11. The controller 12 controls the retrieving module 11 such that only a predefined quantity of liquid is retrieved at a predetermined time and date from the liquid source 1.

Then, the retrieved liquid sample is filled into the sampling container 2. When the predefined quantity of the liquid sample is filled into the sampling container 2, the filling module 13 closes the sampling container 2 by a closure 4. This allows for avoidance of contamination of the liquid sample through external pollution.

As shown in FIGS. 2-4, the closing of the sampling container 2 can for example be done using a weld seam, a glue seam or by using a lace or a cap. The closing of the sampling container 2 can also be done by using an adhesive tape (not shown), for example, instead of the lace shown in FIG. 3. The step of filling the liquid sample into the sampling container 2 can also be done simultaneously to the retrieving step.

In a next step, the filled sampling container 2 is stored in the storing module 14 for a predetermined time period. This time period may be for example defined in a quality chart applicable to the liquid sample. For example, the quality chart may prescribe a storage of each sampling container 2 for at least 7 days or at least 30 days. When several sampling containers 2 are respectively filled with a liquid sample, the storing of the sampling container 2 can be performed in a chronological order.

In a next step, the sampling container 2 can be presented to a user, for example after the user has requested to obtain the sampling container 2. In case several sampling containers have been filled and stored by the sampling system 10, a specific sampling container 2 among several sampling containers can be selected and presented to the user by the sampling system 10. The transporter 17 may, for example, choose the desired sampling container 2 and present it to the user.

In a further step, the sampling container 2 containing the liquid sample is discarded by the disposal module 15. This step may be executed after the liquid sample has been stored in the storage module 14 for a predetermined time period. For example, if the liquid sample has been stored for four weeks, the liquid sample is discarded. Alternatively, the step of discarding the liquid sample may be executed after a specific event has occurred. For example, if the controller 12 detects that the storage module 14 is filled with sampling containers, the oldest liquid sample contained in a sampling container may be discarded according to the first-in-first-out principle, also called FIFO principle. The time until the storage module 14 is full depends on the sampling rate. The sampling rate may depend on the flow rate of the liquid provided in the liquid source 1. For example, if the flow rate of the liquid in the liquid source 1 is high, the sampling rate is also high and vice versa. The sampling rate may be, for example, one liquid sample per hour. Another specific event for triggering the discarding step of a liquid sample contained in a sampling container 2 could be that one or several liquid samples contained in a sampling container 2 have been taken out of the sampling system 10 by a user and that the rest of the sampling containers 2 or a certain number of the remaining sampling containers 2 are no longer needed. The reason why the discarding sampling containers 2 are no longer needed may be because they are older than the sampling containers 2 that have been taken out of the sampling system 10.

The discarding of the liquid sample and the sampling container 2 can be done separately. In this case, the sampling container 2 is opened by the disposal module 15. Then the disposal module 15 empties the liquid sample into the liquid drainage 5 and moves the emptied sampling container 2 into the waste bin 6. The opening of the sampling container 2 can be done for example by puncturing or cutting the sampling container 2 or by removing the closure 4. The discarded liquid sample can be inserted upstream to the sampling system 10 into the liquid source 1 in case the liquid source 1 is, for example, a purification plant. The discarded sampling container 2 can be collected in the waste bin 6 in order to be recycled or disintegrated.

In an alternative discarding step, the liquid sample and the sampling container 2 are discarded simultaneously. Then, the disposal module 15 inserts the filled sampling container 2 into the waste bin 6 or the liquid drainage 5. The filled sampling container 2 can be introduced, for example, into a digestion tower.

Previously, simultaneously or subsequently to the filling step, the sampling container 2 can be marked with an identification code 3 by the identification module 16. The marking step can be performed after or before the step of filling the sampling container 2 with the liquid sample. In case the marking step is performed after filling of the sampling container 2 with the liquid sample, the exact sample volume, measured by the filling module 13, can be added to the identification code 3. The identification code 3 may include data relating to the sampling system, sampling location, sampling time, sampling date, sampling volume and may include other data, like temperature or a laboratory address.

During all steps performed by the sampling system 10, a transporter 17 can be used to move the sampling container 2 between the different stages starting at the filling of the sampling container 2 and ending at the discarding of the sampling container 2 or presenting of the sampling container 2 to a user.

The invention claimed is:

1. A waste-water sampling system for processing a liquid sample, including:
a retrieving module configured to be fluidically connected to a liquid-source and configured to retrieve a liquid sample from the liquid-source;
a filling module configured to fill the at least two retrieved liquid sample into a sampling container for storing a liquid sample, such that a first liquid sample is in a first sampling container and a second liquid sample is in a second sampling container;
a storing module adapted to store the first and second sampling containers, each filled with the liquid samples;
a disposal module adapted to discard the liquid sample, wherein the disposal module is configured to open the first or second sampling container in a destructive way such that the liquid sample is evacuated from the first or second sampling container, wherein the disposal module comprises a liquid drainage adapted to receive the discarded liquid sample; and
a transporter configured to transport the first or second sampling container filled or not filled with a liquid sample between at least the retrieving module, the filling module, the storing module and the disposal module, wherein the transporter is adapted to choose one desired sampling container out of the at least first and second sampling containers and present the chosen one desired sampling container to a user;
wherein the step of discarding the liquid sample comprises insertion of the liquid sample upstream to the sampling system into the liquid source.

2. The waste-water sampling system of claim 1, wherein the filling module is configured to close the sampling container filled with the liquid sample by a weld seam or a glue seam.

3. The waste-water sampling system of claim 1, wherein the sampling system further includes an identification module configured to mark an identification code on the sampling container.

4. The waste-water sampling system of claim 1, wherein the disposal module is arranged below the storing module.

5. The waste-water sampling system of claim 1, wherein the storing module is configured to store several sampling containers, each filled with a liquid sample, in a chronological order, wherein the storing module is organized according to a first-in-first-out principle.

6. The waste-water sampling system of claim 1, wherein the disposal module includes a waste bin, wherein the waste bin is configured for receiving the evacuated sampling container.

7. The waste-water sampling system of claim 1, wherein the sampling system further includes a transporter configured to transport the sampling container filled or not filled with a liquid sample between at least the retrieving module, the filling module and the disposal module.

8. A waste-water sampling method for processing a liquid sample, wherein the sampling method includes at least the steps of:
providing a liquid-source and a sampling system, wherein the sampling system includes:
a retrieving module fluidically connected to the liquid-source and configured to retrieve a liquid sample from the liquid-source; a filling module configured to fill the retrieved liquid sample into a sampling container, wherein the sampling container is a single-use sampling container made of a bio-degradable material; a storing module adapted to store the sampling container filled with the liquid sample; and a disposal module adapted to discard the liquid sample;
retrieving the liquid sample from the liquid-source by the retrieving module;

filling the sampling container with the retrieved liquid sample by the filling module, wherein the sampling container is for storing a liquid sample, wherein the sampling container is a single use sampling container made from a biodegradable material;

storing the sampling container filled with the liquid sample in the storing module; and choosing one desired sampling container out of the at least first and second sampling containers in the storing module by the transporter, presenting the chosen one desired sampling container to a user by the transporter, discarding the liquid sample by the disposal module; and wherein the step of discarding the liquid sample includes opening the sample container by the disposal module in a destructive way such that the liquid sample is evacuated from the sampling container, wherein the step of discarding the liquid sample includes emptying the liquid sample into the liquid drainage;

wherein the transporter transports the sampling container filled or not filled with a liquid sample between at least the retrieving module, the filling module, the storing module and the disposal module;

wherein the step of discarding the liquid sample comprises insertion of the liquid sample upstream to the sampling system into the liquid source.

9. The waste-water sampling method of claim 8, wherein after or before the step of filling the sampling container, a step of marking the sampling container with an identification code by the identification module is performed.

10. The waste-water sampling method of claim 8, wherein at least two sampling containers are each filled with a liquid sample and are stored in the storing module in a chronological order, wherein the storing module is organized according to a first-in-first-out principle.

11. The waster-water sampling method of claim 8, wherein after the storing step, the sampling container is presented to a user.

* * * * *